US010401062B2

(12) United States Patent
Abei et al.

(10) Patent No.: US 10,401,062 B2
(45) Date of Patent: Sep. 3, 2019

(54) COLD STORAGE HEAT EXCHANGER

(71) Applicant: DENSO CORPORATION, Kariya, Aichi-pref. (JP)

(72) Inventors: Jun Abei, Kariya (JP); Tomohiko Nakamura, Kariya (JP); Hirofumi Futamata, Kariya (JP); Yuusuke Kitou, Kariya (JP); Toshiya Nagasawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 337 days.

(21) Appl. No.: 15/024,047

(22) PCT Filed: Sep. 19, 2014

(86) PCT No.: PCT/JP2014/004821
§ 371 (c)(1),
(2) Date: Mar. 23, 2016

(87) PCT Pub. No.: WO2015/045344
PCT Pub. Date: Apr. 2, 2015

(65) Prior Publication Data
US 2016/0252281 A1  Sep. 1, 2016

(30) Foreign Application Priority Data

Sep. 25, 2013  (JP) .................................. 2013-197882

(51) Int. Cl.
*F25B 39/00* (2006.01)
*B60H 1/00* (2006.01)
(Continued)

(52) U.S. Cl.
CPC ............. *F25B 39/00* (2013.01); *B60H 1/005* (2013.01); *B60H 1/00335* (2013.01);
(Continued)

(58) Field of Classification Search
CPC ...... F25B 39/00; F25B 39/02; F25B 2400/24; B60H 1/005; B60H 1/00335;
(Continued)

(56) References Cited

U.S. PATENT DOCUMENTS

| 6,449,979 B1* | 9/2002 | Nagasawa | F28D 1/0391 62/503 |
|---|---|---|---|
| 2010/0065244 A1* | 3/2010 | Yokoyama | F28D 1/05383 165/10 |

(Continued)

FOREIGN PATENT DOCUMENTS

| EP | 2293001 A2 | 3/2011 |
|---|---|---|
| JP | 10-132423 | 5/1998 |

(Continued)

OTHER PUBLICATIONS

Niimura, Etsuo, Evaporator, Aug. 2007, European Patent Office, English Translation.*

(Continued)

*Primary Examiner* — Frantz F Jules
*Assistant Examiner* — Steve S Tanenbaum
(74) *Attorney, Agent, or Firm* — Harness, Dickey & Pierce, P.L.C.

(57) ABSTRACT

A cold storage heat exchanger includes a plurality of tubes, a coolant flowing in the tubes, a cold storage material container joined to the tubes, the cold storage material container defining a room that houses a cold storage material, and a distribution tank unit that distributes the coolant to the tubes. A coolant passage is formed in the tubes and the distribution tank unit. The distribution tank unit includes an aperture plate that reduces a passage cross-sectional area of the coolant passage. Among the plurality of tubes, the cold storage material container is joined to at least a tube disposed upstream in a coolant flow direction from the aperture (Continued)

plate in the coolant passage. Accordingly, cold storage performance may be improved.

6 Claims, 15 Drawing Sheets

(51) Int. Cl.

| | | |
|---|---|---|
| *F28D 20/02* | (2006.01) | |
| *B60H 1/32* | (2006.01) | |
| *F28F 1/12* | (2006.01) | |
| *F28D 20/00* | (2006.01) | |
| *F28D 1/053* | (2006.01) | |
| *F28F 9/02* | (2006.01) | |
| *F25B 39/02* | (2006.01) | |

(52) U.S. Cl.
CPC .......... *B60H 1/3227* (2013.01); *F25B 39/02* (2013.01); *F28D 1/05391* (2013.01); *F28D 20/0034* (2013.01); *F28D 20/021* (2013.01); *F28F 1/126* (2013.01); *F28F 9/028* (2013.01); *F25B 2400/24* (2013.01); *F25B 2500/18* (2013.01); *F28D 2020/0013* (2013.01); *F28F 2275/04* (2013.01); *Y02E 60/142* (2013.01)

(58) Field of Classification Search
CPC . B60H 1/3227; F28D 20/021; F28D 20/0034; F28D 1/05391; F28D 2020/0013; F28F 9/028; F28F 1/126; Y02E 60/142
USPC .......................................................... 62/434
See application file for complete search history.

(56) References Cited

U.S. PATENT DOCUMENTS

| | | |
|---|---|---|
| 2010/0307180 A1 | 12/2010 | Yamada et al. |
| 2011/0220318 A1* | 9/2011 | Kopchick ............ F28D 1/05375 165/41 |
| 2014/0083662 A1 | 3/2014 | Yamada et al. |
| 2014/0083663 A1 | 3/2014 | Yamada et al. |
| 2014/0090826 A1 | 4/2014 | Yamada et al. |
| 2015/0153090 A1 | 6/2015 | Yamada et al. |

FOREIGN PATENT DOCUMENTS

| | | | | |
|---|---|---|---|---|
| JP | 2001074388 A | 3/2001 | | |
| JP | 03-247993 B2 | 1/2002 | | |
| JP | 2005291659 A | 10/2005 | | |
| JP | 2007192447 A * | 8/2007 | ............ | F25B 9/006 |
| JP | 2007192447 A * | 8/2007 | ............ | F25B 9/006 |
| JP | 2007327664 A | 12/2007 | | |
| JP | 2010091250 A | 4/2010 | | |
| JP | 2011012947 A | 1/2011 | | |
| JP | 2011158127 A | 8/2011 | | |
| JP | 2012032112 A | 2/2012 | | |
| JP | 2012098016 A | 5/2012 | | |
| WO | WO-2007083680 A1 | 7/2007 | | |

OTHER PUBLICATIONS

International Search Report and Written Opinion (in Japanese with English Translation) for PCT/JP2014/004821, dated Dec. 16, 2014; ISA/JP.

* cited by examiner

COLD STORAGE HEAT EXCHANGER

CROSS-REFERENCE TO RELATED APPLICATIONS

This application is a U.S. National Phase Application 35 U.S.C. 371 of International Application No. PCT/JP2014/004821 filed on Sep. 19, 2014 and published in Japanese as WO 2015/045344 A1 on Apr. 2, 2015. This application is based on and claims the benefit of priority from Japanese patent application No. 2013-197882 filed on Sep. 25, 2013. The entire disclosures of all of the above applications are incorporated herein by reference.

TECHNICAL FIELD

The present disclosure relates to a cold storage heat exchanger used in a refrigeration cycle device.

BACKGROUND ART

Conventionally, a refrigeration cycle device is used in an air conditioning device. There have been attempts to provide limited cooling even when this refrigeration cycle device is in a stopped state. For example, in a vehicular air conditioning device, a compressor of a refrigeration cycle device is driven by a driving engine. For this reason, if the engine is stopped while the vehicle is temporarily parked, then the refrigeration cycle device stops. In order to provide limited cooling during this temporary parking, a cold storage heat exchanger is known, in which a cold storage material that stores cold energy is added to the refrigeration cycle device (for example, refer to Patent Literature 1).

PRIOR ART LITERATURE

Patent Literature

Patent Literature 1: JP 2010-091250 A

SUMMARY OF THE INVENTION

According to a refrigeration cycle device disclosed in the above described Patent Literature 1, a cold storage material is housed within a cold storage material container, and the cold storage material container is positioned adjacent to a tube through which a coolant flows. Accordingly, when storing cold energy into the cold storage material, cold energy is transmitted from the coolant flowing in the adjacent tube to the cold storage material. At this time, the cold storage material is cooled by vaporization latent heat as the coolant is vaporized.

However, when storing cold energy to the cold storage material, the coolant in the tube, which is adjacent to the cold storage material container, evaporates and a pressure loss in the tube increases. For this reason, even if it is desirable to quickly complete storing cold energy into the cold storage material, during the cold storage process, the pressure loss in the tube adjacent to the cold storage material container increases, and it becomes difficult for the coolant to flow. As a result, there is a concern that cold storage performance may decrease. If paraffin or the like is used as the cold storage material such that latent heat of fusion during phase change of the paraffin is used to store cold energy, a large transfer of heat occurs near the melting point of the cold storage material, and the reduction in cold storage performance becomes particularly noticeable.

In view of the above points, it is an object of the present disclosure to provide a cold storage heat exchanger that may improve cold storage performance.

According to a first embodiment, a cold storage heat exchanger includes a plurality of tubes disposed with a spacing between each other, a coolant flowing in the tubes, a cold storage material container joined to the tubes, the cold storage material container defining a room that houses a cold storage material, and a distribution tank unit that distributes the coolant to the tubes, where a coolant passage is formed in the tubes and the distribution tank unit, the distribution tank unit includes a reduction unit that reduces a passage cross-sectional area of the coolant passage in the distribution tank unit, and among the plurality of tubes, the cold storage material container is joined to a tube disposed upstream in a coolant flow direction from the reduction unit in the coolant passage.

Accordingly, by disposing the reduction unit in the distribution tank unit to reduce the passage cross-sectional area of the coolant passage in the distribution tank unit, coolant may be held back at the reduction unit. Then, among the plurality of tubes, the cold storage material container is joined to a tube disposed upstream in a coolant flow direction from the reduction unit in the coolant passage, therefore the coolant held back at the reduction unit flows more easily into the tube joined to the cold storage material container. For this reason, the flow rate of coolant flowing through the tube joined to the cold storage material container may be increased, and cold storage performance may be improved.

Further, according to a second embodiment, a cold storage heat exchanger includes a plurality of tubes disposed with a spacing between each other, a coolant flowing in the tubes, a cold storage material container joined to the tubes, the cold storage material container defining a room that houses a cold storage material, and a distribution tank unit that distributes the coolant to the tubes, where a coolant passage is formed in the tubes and the distribution tank unit, the plurality of tubes include a large channel tube in which a passage cross-sectional area of the coolant passage is greater than the other tubes, and the cold storage material container is joined to the large channel tube.

Accordingly, by disposing the large channel tube in which the passage cross-sectional area of the coolant passage is greater than the other tubes, coolant flows more easily into the large channel tube. Then, because the cold storage material container is joined to the large channel tube, the flow rate of coolant flowing through the tube joined to the cold storage material container may be increased, and cold storage performance may be improved.

EMBODIMENTS FOR CARRYING OUT INVENTION

Figure 1:
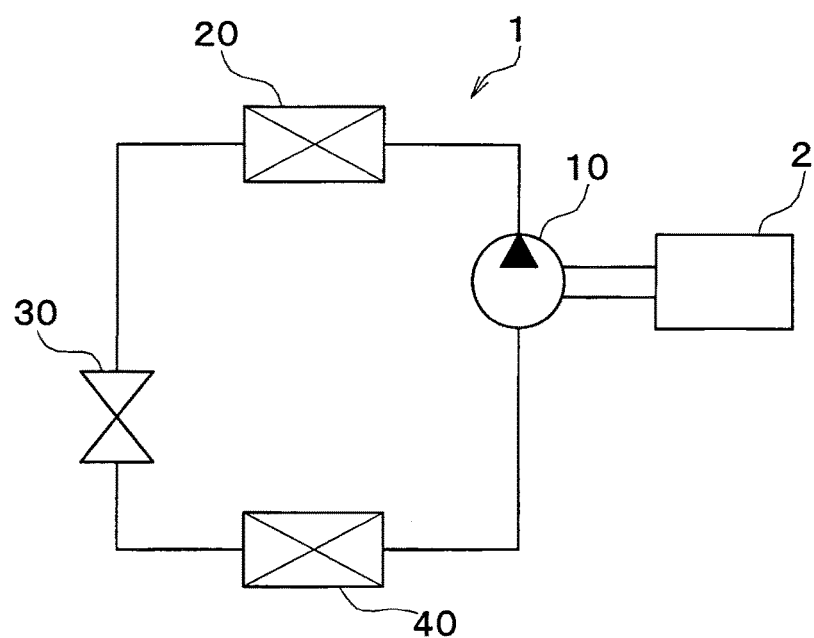
FIG. 1 shows the configuration of a refrigeration cycle device constituting a vehicle air conditioning device according to a first embodiment.

Next, embodiments of the present disclosure will be explained with reference to the figures. In each embodiments, portions which correspond to matters described in a previous embodiment are denoted with the same reference numerals, and explanations thereof are omitted for brevity where appropriate. If only a portion of the configuration of an embodiment is described, other previously described embodiments may be applied to the other portions of the configuration. The embodiments are not limited to combinations of portions which are specifically stated as being combinable. Instead, even without being stated, portions of embodiments may be combined with each other provided that no particular problem occurs for those combinations.

(First Embodiment)

The configuration of a refrigeration cycle device that constitutes a vehicular air conditioning device according to a first embodiment of the present disclosure is shown in FIG. 1. A refrigeration cycle device 1 that constitutes this air conditioning device includes a compressor 10, a radiator 20, a decompressor 30, and an evaporator 40. These components are connected in a cycle by piping, and form a cooling circulation path.

The compressor 10 is driven by a power source 2 that drives the vehicle. The power source 2 is an internal combustion engine (or electric motor, etc.). When the power source 2 stops, the compressor 10 also stops. The compressor 10 draws coolant from the evaporator 40, compresses the coolant, and then discharges the coolant to the radiator 20. The radiator 20 cools the high temperature coolant. The radiator 20 is also referred to as a condenser. The decompressor 30 decompresses the coolant which was cooled by the radiator 20. The evaporator 40 causes the coolant, which was decompressed by the decompressor 30, to evaporate, and cools the air within the vehicle interior.

Figure 2:
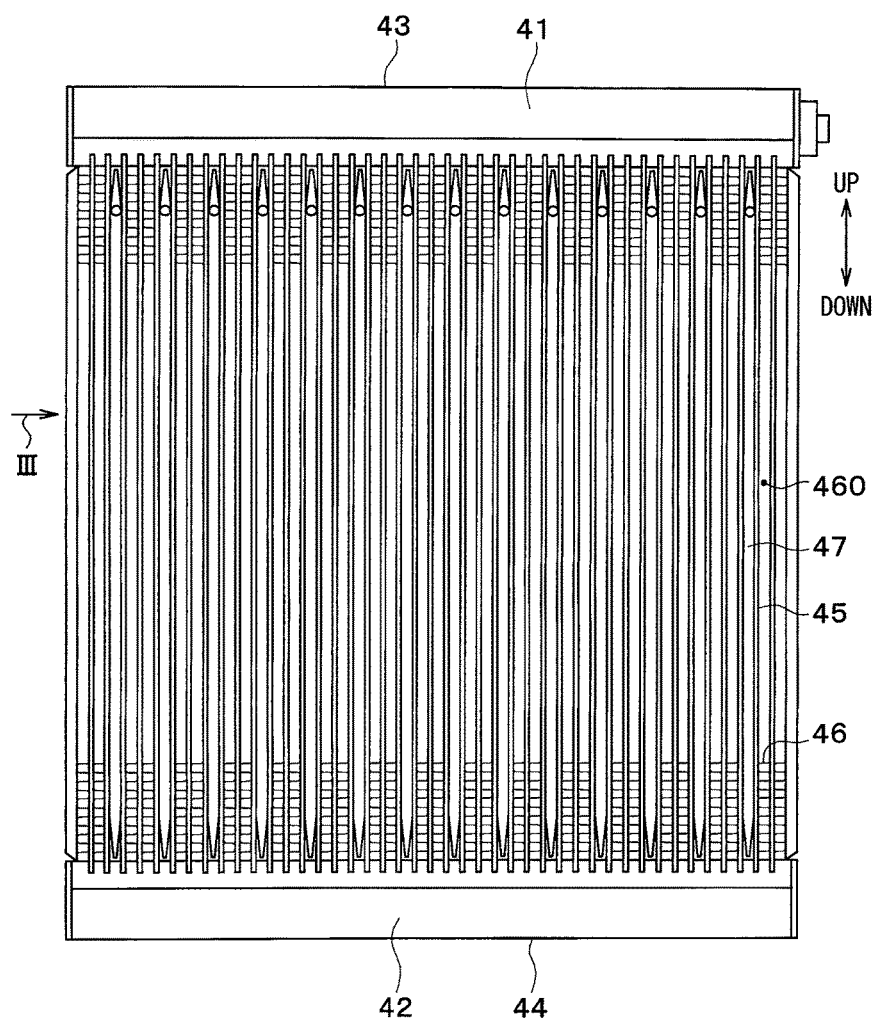
FIG. 2 is a plane view showing an evaporator according to a first embodiment.
Figure 3:
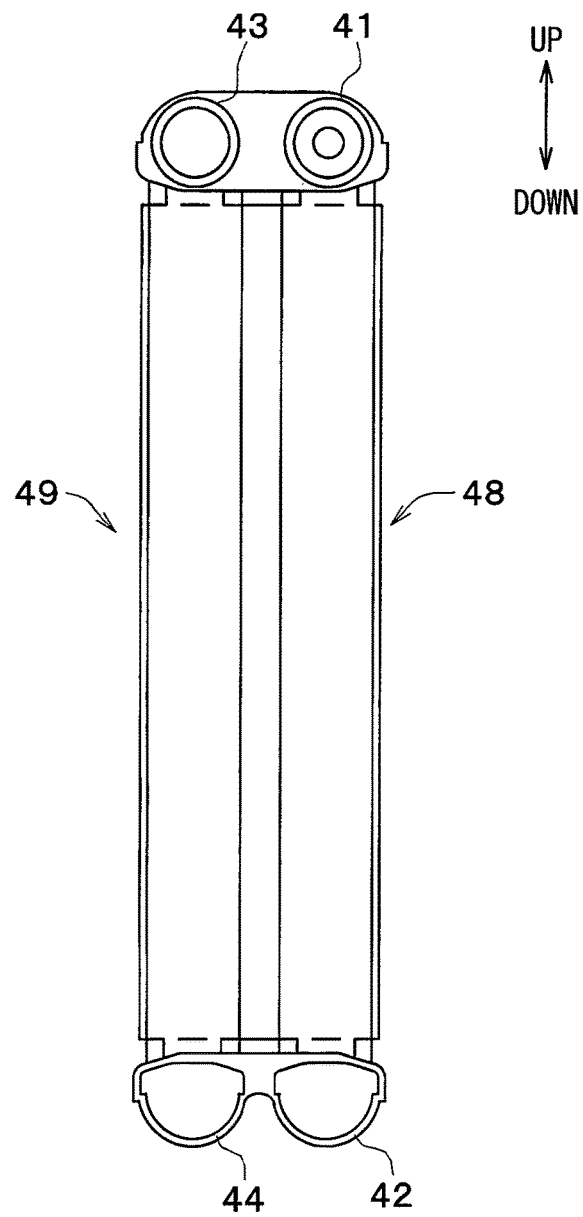
FIG. 3 is a view along arrow III of FIG. 2.
Figure 19:
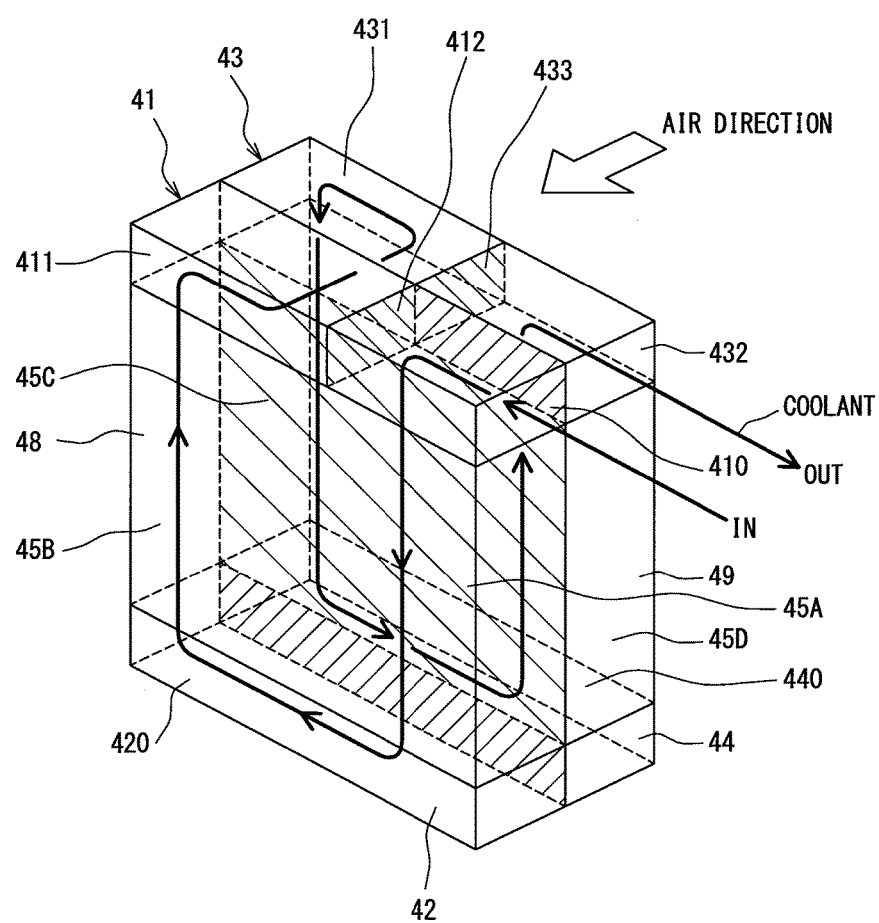
FIG. 19 is an explanatory view showing coolant flow in an evaporator of the present disclosure.

In FIGS. 2, 3, and 19, the evaporator 40 includes a first heat exchange unit 48 and a second heat exchange unit 49 which are disposed as two layers. The second heat exchange unit 49 is positioned upstream in the airflow direction, while the first heat exchange unit 48 is positioned downstream in the airflow direction.

Specifically, the evaporator 40 includes a plurality of branching coolant passage members. These coolant passage members are metal passage members formed from, e.g., aluminum. The coolant passage members are provided by first to fourth headers 41-44 which are positioned in pairs, and a plurality of tubes 45 connected between these headers 41-44. A coolant passage is formed in the first to fourth headers 41-44 and the tubes 45.

The first header 41 and the second header 42 form a pair, and are positioned parallel to each other and separated by a predetermined distance. The third header 43 and the fourth header 44 form a pair, and are positioned parallel to each other and separated by a predetermined distance.

The plurality of tubes 45 are arranged between the first header 41 and the second header 42 in an evenly spaced manner. FIG. 19 shows an outline of the evaporator 40, and illustrations of the tubes 45 are omitted. Each end of the tubes 45 is in communication with a corresponding one of the headers 41, 42. The first header 41, the second header 42, and the plurality of tubes 45 positioned thereinbetween form the first heat exchange unit 48 (refer to FIG. 3). The plurality of tubes 45 that constitute the first heat exchange unit 48 include one end portion in the lengthwise direction that is disposed in the first header 41, and an other end portion in the lengthwise direction that is disposed in the second header 42.

The plurality of tubes 45 are arranged between the third header 43 and the fourth header 44 in an evenly spaced manner. Each end of the tubes 45 is in communication with a corresponding one of the headers 43, 44. The third header 43, the fourth header 44, and the plurality of tubes 45 positioned thereinbetween form the second heat exchange unit 49 (refer to FIG. 3). The plurality of tubes 45 that constitute the second heat exchange unit 49 include one end portion in the lengthwise direction that is disposed in the third header 43, and an other end portion in the lengthwise direction that is disposed in the fourth header 44.

A joint, not shown, that acts as a coolant inlet is disposed in an end portion of the first header 41. A partition plate 412 is disposed at substantially the center of the first header 41 in the lengthwise direction thereof. Accordingly, the inside of the first header 41 is compartmentalized into a first compartment 410 and a second compartment 411. In this regard, the plurality of tubes 45 are divided into a first group 45A and a second group 45B. In FIG. 19, the tubes 45 are not illustrated, but the reference numerals "45A" and "45B" indicate locations in the evaporator 40 that correspond to the first group 45A and the second group 45B. In addition, the same applies to a first group 45C and a second group 45D, which are described later.

The coolant is supplied to the first compartment 410 of the first header 41. The coolant is distributed from the first compartment 410 to the plurality of tubes 45 belonging to the first group 45A. The coolant flows through the first group 45A into the second header 42, and is collected. Then, the coolant is again distributed from the second header 42 to the plurality of tubes 45 belonging to the second group 45B. The coolant flows through the second group 45B and into the second compartment 411 of the first header 41. In this manner, a flow path in which coolant flows in a U-shape is formed in the first heat exchange unit 48.

A joint, not shown, that acts as a coolant outlet is disposed in an end portion of the third header 43. A partition plate 433 is disposed at substantially the center of the third header 43 in the lengthwise direction thereof. Accordingly, the inside of the third header 43 is compartmentalized into a first compartment 431 and a second compartment 432. In this regard, the plurality of tubes 45 are divided into a first group 45C and a second group 45D. The first compartment 431 of the third header 43 is adjacent to the second compartment 411 of the first header 41. The first compartment 431 of the third header 43 is in communication with the second compartment 411 of the first header 41.

The coolant flows from the second compartment 411 of the first header 41 into the first compartment 431 of the third header 43. The coolant is distributed from the first compartment 431 to the plurality of tubes 45 belonging to the first group 45C. The coolant flows through the first group 45C into the fourth header 44, and is collected. Then, the coolant is again distributed from the fourth header 44 to the plurality of tubes 45 belonging to the second group 45D. The coolant flows through the second group 45D and into the second compartment 432 of the third header 43. In this manner, a flow path in which coolant flows in a U-shape is also formed in the second heat exchange unit 49. The coolant in the second compartment 432 of the third header 43 flows out of the coolant outlet and toward the compressor 10.

Accordingly, the first compartment 410 of the first header 41, the portions of the second header 42 that correspond to the plurality of tubes 45 belonging to the second group 45B, the first compartment 431 of the third header 43, and the portions of the fourth header 44 that correspond to the plurality of tubes 45 belonging to the second group are configured so as to distribute the coolant to the tubes 45, and correspond to a "distribution tank unit" of the present disclosure.

Hereinafter, the first compartment 410 of the first header 41 is referred to as a first distribution tank unit 410, and the portions of the second header 42 that correspond to the plurality of tubes 45 belonging to the second group 45B are referred to as a second distribution tank unit 420. Further, the first compartment 431 of the third header 43 is referred to as a third distribution tank unit 431, and the portions of the fourth header 44 that correspond to the plurality of tubes 45 belonging to the second group 45D are referred to as a fourth distribution tank unit 440.

According to the present embodiment, the first header 41 and the third header 43 are positioned above the tubes 45 in the vertical direction. The second header 42 and the fourth header 44 are positioned below the tubes 45 in the vertical direction. Further, according to the first heat exchange unit 48 and the second heat exchange unit 49 of this embodiment, the coolant flows up in the vertical direction once and flows down in the vertical direction once, and the coolant flows in difference directions in the first heat exchange unit 48 and the second heat exchange unit 49. However, alternatively, the coolant may also flow one or more times in each of up and down in the vertical direction in each heat exchange unit 48, 49, and the coolant may also flow in the same direction in the first heat exchange unit 48 and the second heat exchange unit 49.

In FIG. 2, the plurality of tubes 45 are disposed with a substantially constant spacing. A plurality of gaps are formed between these plurality of tubes 45. A plurality of air-side fins 46 and a plurality of cold storage material containers 47 are soldered in these plurality of gaps. The plurality of air-side fins 46 and the plurality of cold storage material containers 47 are, for example, positioned with a predetermined regularity. A portion of the gaps are cooling air passages 460. The remaining portion of the gaps are housing portions in which the cold storage material containers 47 are disposed.

Between 10% and 50%, inclusive, of the total gaps formed between the plurality of tubes 45 are housing portions. The cold storage material containers 47 are disposed so as to be spread out approximately uniformly in the entirety of the evaporator 40. The two tubes 45 on either side of each cold storage material container 47 partitions the cooling air passage 460 for heat exchange with air on an opposite side form the cold storage material container 47.

The tubes 45 are formed in a flat board shape, and are perforated pipes that have a plurality of coolant passages therein. The tubes 45 may be obtained through, for example, an extrusion process. The plurality of coolant passages extend along the lengthwise direction of the tubes 45, and open at either end of the tubes 45. The plurality of tubes 45 are lined up in rows. In each row, the plurality of tubes 45 are positioned such that their main surfaces (flat surfaces) face each other.

According to the evaporator 40, the cooling air passages 460 include the air-side fins 46 which are for increasing the contact surface area with air supplied to the vehicle cabin. The air-side fins 46 are disposed in the air passages partitioned by adjacent pairs of the tubes 45. The air-side fins 46 are thermally coupled to the adjacent pairs of tubes 45.

The air-side fins 46 are coupled to adjacent pairs of the tubes 45 by a brazing filler material. The air-side fins 46 are formed by bending a metal sheet such as thin aluminum into a wavy shape, and include shutter-like louvers (not illustrated).

The evaporator 40 is a cold storage heat exchanger that, when the coolant in the evaporator 40 is evaporated and a heat absorbing action is exhibited, the cold storage material is solidified to store cold energy, and when the cold storage material melts, the stored cold energy is released. The evaporator 40 includes the cold storage material containers 47 that define rooms for storing a plurality of the cold storage materials.

The cold storage material containers 47 are formed from a metal such as aluminum, and are formed in a flat container shape. The cold storage material containers 47 define the rooms for housing therein the cold storage material by joining a pair of plate members having a substantially U-shaped cross section.

The cold storage material containers 47 have a wide main surface (flat surface) on either side. The main walls providing these two main surfaces are each positioned parallel with the tubes 45. These two main walls have an uneven shape.

The cold storage material containers 47 are positioned between adjacent pairs of the tubes 45. The cold storage material containers 47 are joined to the pair of the tubes 45 positioned on either side. The cold storage material containers 47 are joined to the adjacent pairs of the tubes 45 by a joining material having excellent thermal conductivity. Brazing filler material or fastening materials such as a resin material may be used as the joining material. The cold storage material containers 47 of the present example is soldered to the tubes 45. more specifically, the outer surface of each of the cold storage material containers 47 is joined to both a tube 45 constituting the first heat exchange unit 48 and a tube 45 constituting the second heat exchange unit 49.

A brazing filler material is disposed between the cold storage material containers 47 and the tubes 45 to link their gaps with a wide cross-sectional area. This brazing filler material may be provided by positioning a foil of brazing filler material between the cold storage material containers 47 and the tubes 45. As a result, satisfactory heat conduction occurs between the cold storage material containers 47 and the tubes 45.

Figure 4:
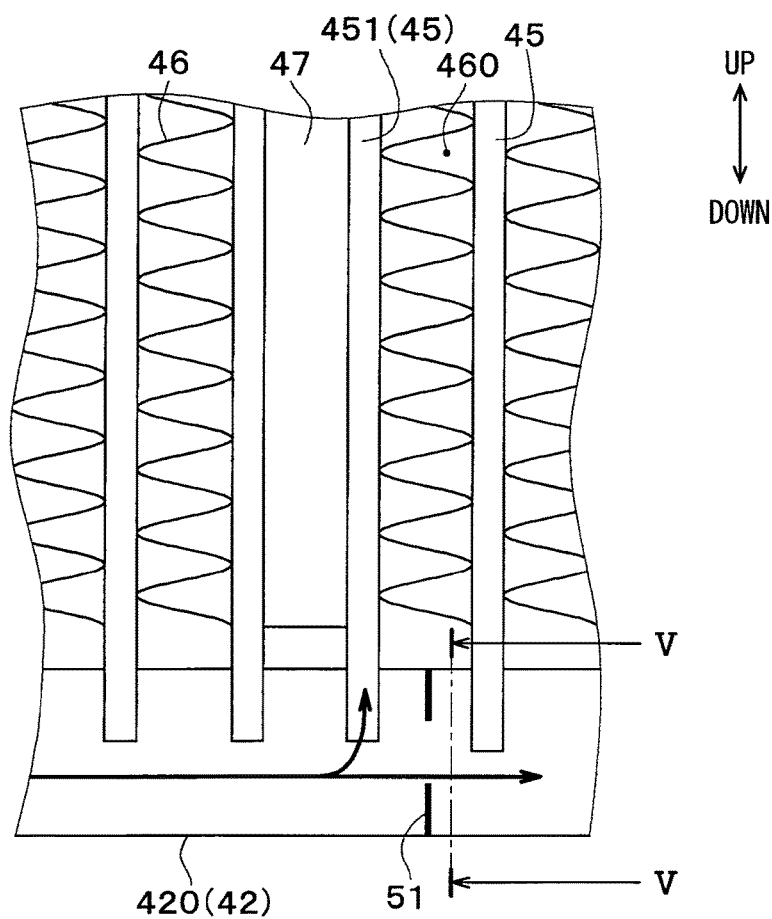
FIG. 4 is an explanatory view showing a portion of an evaporator according to a first embodiment.
Figure 5:
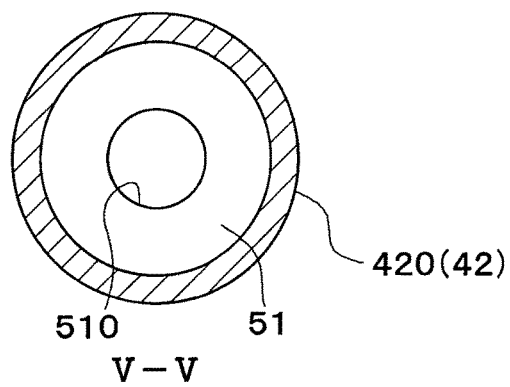
FIG. 5 is a cross-sectional view along V-V of FIG. 4.

As shown in FIGS. 4 and 5, a coolant flow hole 510 and an aperture plate 51 are disposed in the second distribution tank unit 420. Coolant flows through the coolant flow hole 510. The aperture plate 51 is formed separately from the second distribution tank unit 420. The aperture plate 51 is joined to each inner wall surface of the second distribution tank unit 420 by soldering.

As shown in FIG. 5, the aperture plate 51 of the present embodiment is disc-shaped. One coolant flow hole 510 is formed at a substantially center portion of the aperture plate 51. Further, the diameter of the coolant flow hole 510 is smaller than the diameter of the coolant passage in the second distribution tank 420 (the inner diameter of the second header 42).

Due to this aperture plate 51, the passage cross-sectional area of the coolant passage in the second distribution tank unit 420 is reduced. Accordingly, the aperture plate 51 corresponds to a reduction unit of the present disclosure.

Returning to FIG. 4, among the plurality of tubes 45, the cold storage material container 47 is joined to the tubes 45 which are positioned upstream in the coolant flow direction from the aperture plate 51 in the coolant passage. In other words, in the coolant passage of the second distribution tank 420, the aperture plate 51 is positioned downstream in the coolant flow direction from the tubes 45 connected to the cold storage material container 47 (hereinafter, referred to as "cold storage material connected tubes 451").

In addition, an example was described in which the aperture plate 51 is disposed in the second distribution tank unit 420. However, the aperture plate 51 may be disposed in one or more of any of the first to fourth distribution tank units 410, 420, 431, 440. Accordingly, in the coolant passages of the first to fourth distribution tank units 410, 420, 431, 440, it is not necessary to position the aperture plate 51 downstream of all cold storage material connected tubes 451.

According to the present embodiment, among the plurality of tubes 45, the cold storage material container 47 is joined to the tubes 45 which are positioned immediately upstream in the coolant flow direction from the aperture plate 51 in the coolant passage. In other words, in the coolant passages in the first to fourth distribution tank units 410, 420, 431, 440, the aperture plate 51 is disposed immediately downstream in the coolant flow direction from, among the pair of tubes 45 connected to the cold storage material container 47, the tube 45 positioned downstream in the coolant flow direction.

As explained above, according to the present embodiment, the aperture plate 51 is disposed in the first to fourth distribution tank units 410, 420, 431, 440 to reduce the passage cross-sectional area of the coolant passage as compared to other portions in the first to fourth distribution tank units 410, 420, 431, 440. Accordingly, the coolant flowing in the coolant passage may be held back at the aperture plate 51.

Then, according to the present embodiment, among the plurality of tubes 45, the cold storage material container 47 is connected to the tubes 45 positioned upstream in the coolant flow direction from the aperture plate 51 in the coolant passage. As a result, the coolant held back at the aperture plate 51 flows more easily into the cold storage material connected tubes 451 which are positioned upstream in the coolant flow direction from the aperture plate 51. For this reason, the coolant flow rate flowing through the cold storage material connected tubes 451 may be increased, and cold storage performance may be improved.

Further, according to the present embodiment, the cold storage material containers 47 are connected to the tubes 45 positioned immediately upstream in the coolant flow direction from the aperture plate 51 in the coolant passage. Accordingly, the coolant flow rate flowing through the cold storage material connected tubes 451 may be further increased, and cold storage performance may be improved.

(Second Embodiment)

Next, a second embodiment of the present disclosure will be explained with reference to FIG. 6. When compared to the first embodiment described above, the present embodiment is different in that a protruding portion 52, which is described later, is disposed in the second distribution tank unit 420.

Figure 6:
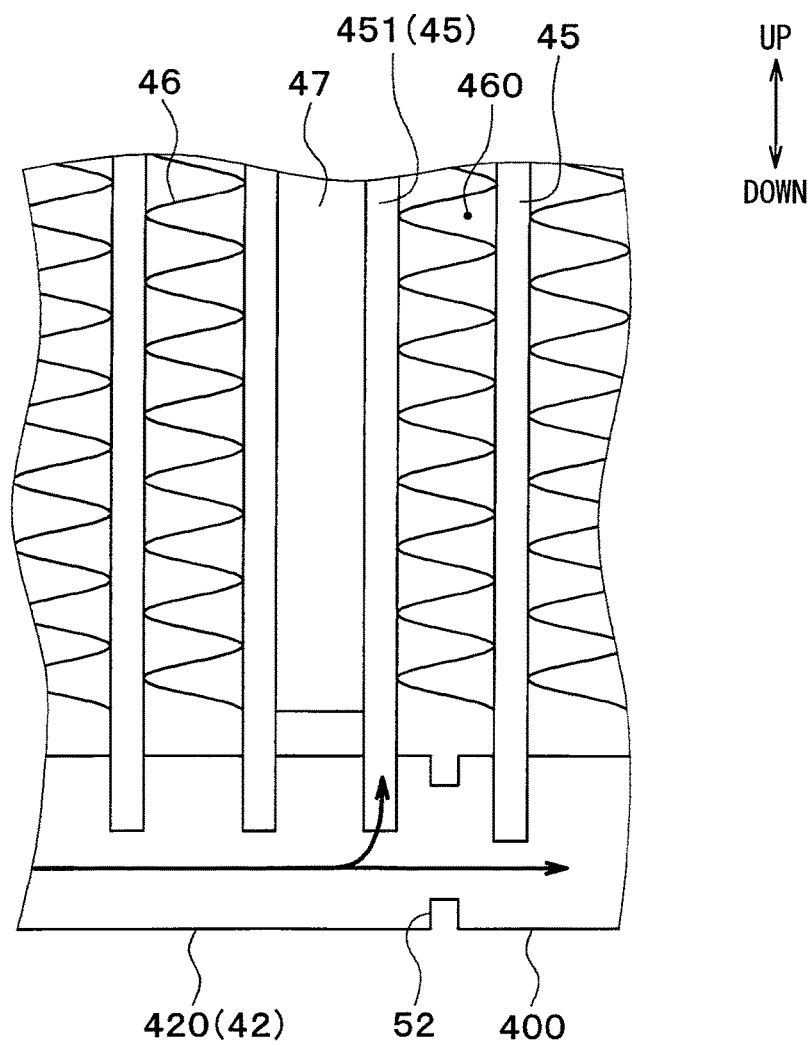
FIG. 6 is an explanatory view showing a portion of an evaporator according to a second embodiment.

As shown in FIG. 6, the second distribution tank unit 420 respectively includes a protruding portion 52 that protrudes inward of each tank from the inner circumference surface of a wall portion 400 that forms the coolant passage in the second distribution tank unit 420. According to the present embodiment, the protruding portion 52 is disposed over the entire circumference of the each second distribution tank unit 420. Specifically, the protruding portion 52 is formed by indenting over the entire circumference of the outer circumferential surface of the wall portion 400 of the second distribution tank 420, so that the inner circumferential surface of the wall portion 400 protrudes into the tank. In addition, the protruding portion 52 may be disposed in at least one portion of the each second distribution tank unit 420.

According to this protruding portion 52, the passage cross-sectional area of the coolant passage in each of the first to fourth distribution tank units 410, 420, 431, 440 is reduced. Accordingly, the protruding portion 52 corresponds to a reduction unit of the present disclosure.

Among the plurality of tubes 45, the cold storage material container 47 is joined to the tubes 45 positioned upstream in the coolant flow direction from the protruding portion 52 in the coolant passage. In other words, in the coolant passage of the second tank unit 420, the protruding portion 52 is disposed downstream in the coolant flow direction from the cold storage material connected tubes 451.

Further, according to the second embodiment, similar to the first embodiment, an example was described in which the protruding portion 52 is disposed in the second distribution tank unit 420. However, the protruding portion 52 may be disposed in one or more of any one of the first to fourth distribution tank units 410, 420, 431, 440. Accordingly, in the coolant passages of the first to fourth distribution tank units 410, 420, 431, 440, it is not necessary to dispose the protruding portion 52 downstream of all cold storage material connected tubes 451.

According to the present embodiment, among the plurality of tubes 45, the cold storage material container 47 is joined to the tubes 45 which are positioned immediately upstream in the coolant flow direction from the protruding portion 52 in the coolant passage. In other words, in the coolant passages in the first to fourth distribution tank units 410, 420, 431, 440, the protruding portion 52 is disposed immediately downstream in the coolant flow direction from, among a pair of tubes 45 connected to the cold storage material containers 47, the tube 45 positioned downstream in the coolant flow direction.

As explained above, according to the present embodiment, the protruding portion 52 is disposed in the first to fourth distribution tank units 410, 420, 431, 440 to reduce the passage cross-sectional area of the coolant passage in the first to fourth distribution tank units 410, 420, 431, 440. Accordingly, the coolant flowing in the coolant passage may be held back at the protruding portion 52.

Then, according to the present embodiment, among the plurality of tubes 45, the cold storage material container 47 is connected to the tubes 45 positioned upstream in the coolant flow direction from the protruding portion 52 in the coolant passage. As a result, the coolant held back at the protruding portion 52 flows more easily into the cold storage material connected tubes 451 which are positioned upstream in the coolant flow direction from the protruding portion 52. For this reason, the coolant flow rate flowing through the cold storage material connected tubes 451 may be increased, and cold storage performance may be improved.

Further, according to the present embodiment, the cold storage material containers 47 are connected to the tubes 45 positioned immediately upstream in the coolant flow direction from the protruding portion 52 in the coolant passage. Accordingly, the coolant flow rate flowing through the cold storage material connected tubes 451 may be further increased, and cold storage performance may be improved.

(Third Embodiment)

Figure 7:
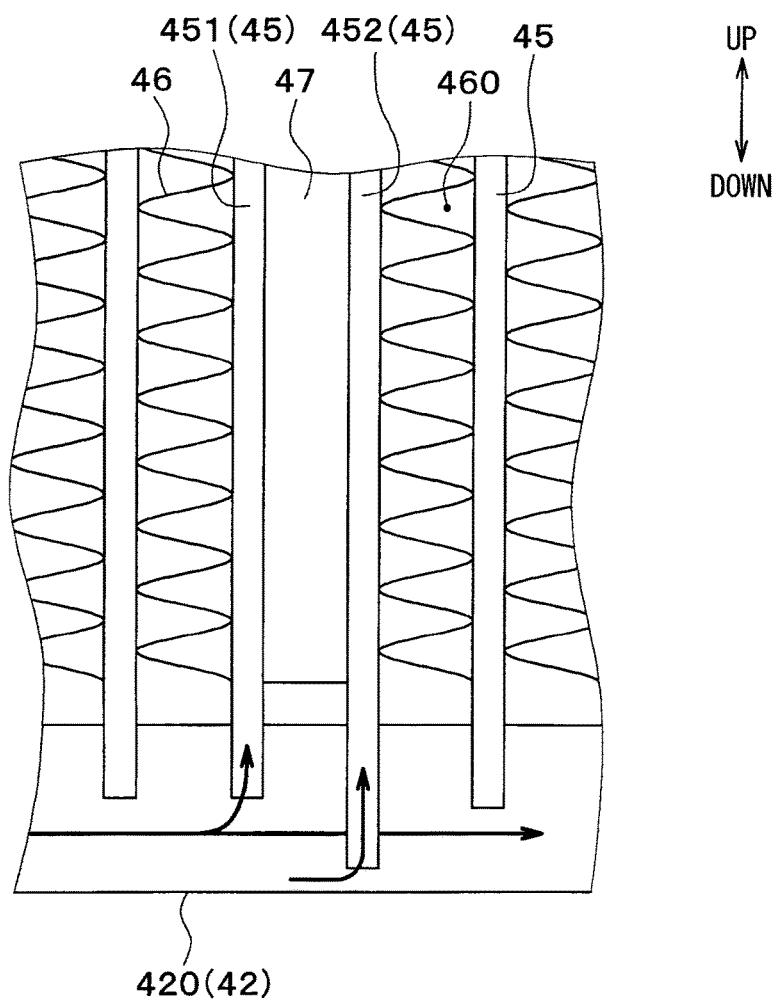
FIG. 7 is an explanatory view showing a portion of an evaporator according to a third embodiment.

Next, a third embodiment of the present disclosure will be explained with reference to FIG. 7. When compared to the above described first embodiment, the tubes 45 of the third embodiment have a different shape.

A length, in the lengthwise direction of the tubes 45, of the portion of the tubes 45 disposed inside the first to fourth distribution tank units 410, 420, 431, 440 is referred to as a protruding length. As shown in FIG. 7, the plurality of tubes 45 in communication with each of the second distribution tank unit 420 and the fourth distribution tank unit 440, which are positioned below the tubes 45 in the vertical direction, include a protruding tube 452 that has a longer protruding length than the other tubes 45. Further, FIG. 7 only shows the second distribution tank unit 420. The protruding tube 452 disposed in the fourth distribution tank unit 440 is the same as the protruding tube 452 disposed in the second distribution tank unit 420, and thus the illustration and explanation there of is omitted.

Due to this protruding tube 452, the passage cross-sectional area of the coolant passage in each of the second distribution tank unit 420 and the fourth distribution tank unit 440 is reduced. Accordingly, the protruding tube 452 corresponds to a reduction unit of the present disclosure.

Among the plurality of tubes 45, the cold storage material container 47 is joined to the tubes 45 positioned upstream in the coolant flow direction from the protruding tube 452 in the coolant passage. According to the present embodiment, the cold storage material container 47 is joined to both the protruding tube 452 and an adjacent tube 45 upstream in the coolant flow direction from the protruding tube 452 in the coolant passage. In other words, among the two cold storage material connected tubes 451 joined to the cold storage material container 47, only the tube 45 that is positioned downstream in the coolant flow direction is the protruding tube 452.

As explained above, according to the present embodiment, the protruding tube 452 is disposed in the second distribution tank unit 420 and the fourth distribution tank unit 440 to reduce the passage cross-sectional area of the coolant passage in the second distribution tank units 420 and the fourth distribution tank unit 440. Accordingly, the coolant flowing in the coolant passage may be held back at the protruding tube 452.

Then, according to the present embodiment, among the plurality of tubes 45, the cold storage material container 47 is connected to the tubes 45 positioned upstream in the coolant flow direction from the protruding tube 452 in the coolant passage. As a result, the coolant held back at the protruding tube 452 flows more easily into the cold storage material connected tubes 451 which are positioned upstream in the coolant flow direction from the protruding tube 452. For this reason, the coolant flow rate flowing through the cold storage material connected tubes 451 may be increased, and cold storage performance may be improved.

Incidentally, in the second distribution tank unit 420 and the fourth distribution tank unit 440, the end portion (coolant inflow portion) of the protruding tube 452 is positioned lower in the vertical direction as compared to the end portions (coolant inflow portions) of the other tubes 45. For this reason, the coolant collected in the second distribution tank unit 420 and the fourth distribution tank unit 440 flows easier into the protruding tube 452 as compared to the other tubes 45.

Further, according to the present embodiment, the protruding tube 452 is joined to the cold storage material container 47. For this reason, the coolant flow rate flowing through the protruding tube 452 joined to the cold storage material container 47 may be increased, and cold storage performance may be further improved.

(Fourth Embodiment)

Next, a fourth embodiment of the present disclosure will be explained with reference to FIG. 8. In the fourth embodiment, as compared with the third embodiment described above, the arrangement location of the protruding tube 452 is different.

Figure 8:
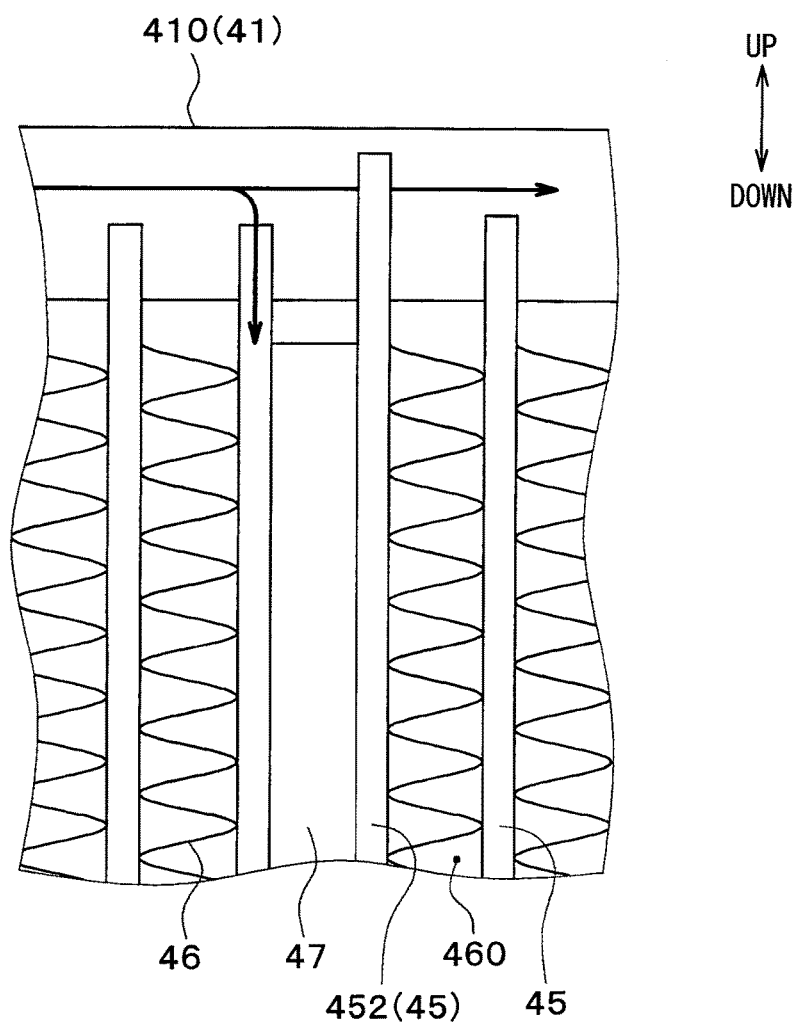
FIG. 8 is an explanatory view showing a portion of an evaporator according to a fourth embodiment.

As shown in FIG. 8, the plurality of tubes 45 in communication with each of the first distribution tank unit 410 and the third distribution tank unit 431, which are positioned above the tubes 45 in the vertical direction, include a protruding tube 452 that has a longer protruding length than the other tubes 45. Further, FIG. 8 only shows the first distribution tank unit 410. The protruding tube 452 disposed in the third distribution tank unit 431 is the same as the protruding tube 452 disposed in the first distribution tank unit 410, and thus the illustration and explanation there of is omitted. Due to this protruding tube 452, the passage cross-sectional area of the coolant passage in each of the first distribution tank unit 410 and the third distribution tank unit 431 is reduced.

As explained above, according to the present embodiment, the protruding tube 452 is disposed in the first distribution tank unit 410 and the third distribution tank unit 431 to reduce the passage cross-sectional area of the coolant passage in the first distribution tank units 410 and the third distribution tank unit 431. Accordingly, the coolant flowing in the coolant passage may be held back at the protruding tube 452. For this reason, the same effects are the third embodiment described above may be obtained.

(Fifth Embodiment)

Next, a fifth embodiment of the present disclosure will be explained with reference to FIG. 9. In the fifth embodiment, as compared with the first embodiment described above, the shapes of the plurality of tubes 45 are different.

Figure 9:
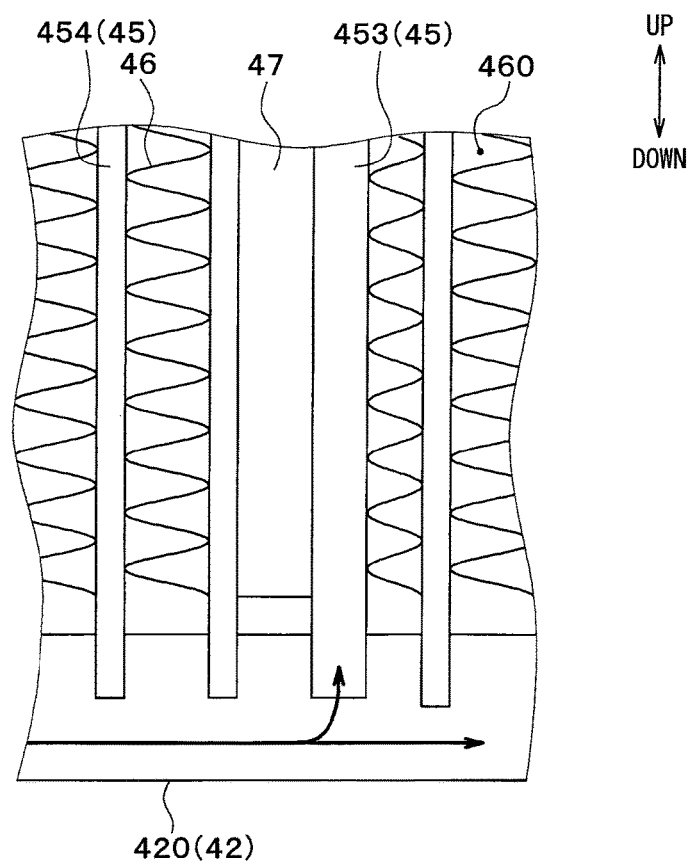
FIG. 9 is an explanatory view showing a portion of an evaporator according to a fifth embodiment.

As shown in FIG. 9, the plurality of tubes 45 include a large channel tube 453 in which the passage cross-sectional area of the coolant passage is greater than that of the other tubes 45. The large channel tube 453 is joined to the cold storage material container 47.

Specifically, the cold storage material container 47 is joined to both the large channel tube 453 and an adjacent tube 45 which is upstream in the coolant flow direction of the coolant passage from the large channel tube 453. In other words, of the two tubes 45 joined to the cold storage material container 47, only the tube 45 positioned downstream in the coolant flow direction is the large channel tube 453.

According to the present embodiment, the outer diameter of the large channel tube 453 is greater than the outer diameters of the other tubes 45 (hereinafter, referred to as normal tubes 454), and the inner diameter of the large channel tube 453 is greater than the inner diameters of the normal tubes 454.

As explained above, according to the present embodiment, the large channel tube 453, which has a greater coolant passage cross-sectional area than the normal tubes 454, is provided. Accordingly, coolant flows more easily into the large channel tube 453. Then, since the cold storage material container 47 is joined to the large channel tube 453, the flow rate of coolant flowing through the tube 45 (the large channel tube 453) joined to the cold storage material container 47 may be increased. Accordingly, cold storage performance may be improved.

(Sixth Embodiment)

Next, a sixth embodiment of the present disclosure will be explained with reference to FIGS. 10 and 11. In the sixth embodiment, as compared with the fifth embodiment described above, the interior shapes of the plurality of tubes 45 are different.

Figure 10:
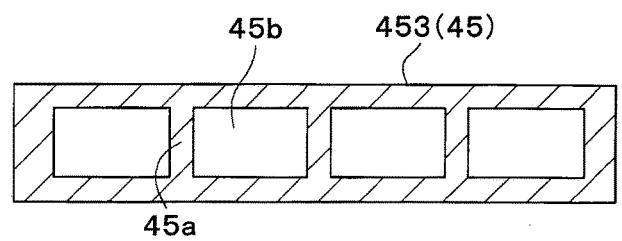
FIG. 10 is an cross-sectional view showing a large channel tube of an evaporator according to a sixth embodiment.
Figure 11:
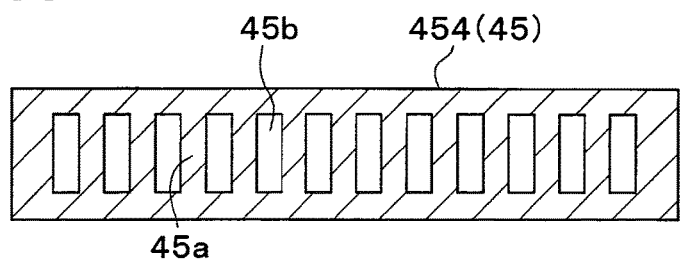
FIG. 11 is an cross-sectional view showing a normal tube of an evaporator according to a sixth embodiment.

As shown in FIGS. 10 and 11, partitioning portions 45a are disposed within the tubes 45, and these partitioning portions 45a divide the coolant passage in the tubes 45 into a plurality of small channels 45b. According to the present embodiment, the plurality of small channels 45b are positioned to line up along the air flow direction.

The normal tubes 454 include more partitioning portions 45a than the large channel tubes 453. As a result, the coolant passages of the normal tubes 454 are more finely divided than the coolant passages of the large channel tubes 453. In other words, the number of small channels 45b of the normal tubes 454 is greater than the number of small channels 45b of the large channel tubes 453. For this reason, the passage cross-sectional area of the coolant passage (total passage cross-sectional area of the plurality of small channels 45b) of the normal tubes 454 is smaller than the passage cross-sectional area of the coolant passage (total passage cross-sectional area of the plurality of small channels 45b) of the large channel tubes 453. According to the present embodiment, the same effects as those of the fifth embodiment described above may be obtained.

(Other Embodiments)

The present disclosure is not limited to the above described embodiments, and a variety of embodiments which do not depart from the gist of the present disclosure, such as those below, are contemplated.

Figure 12:
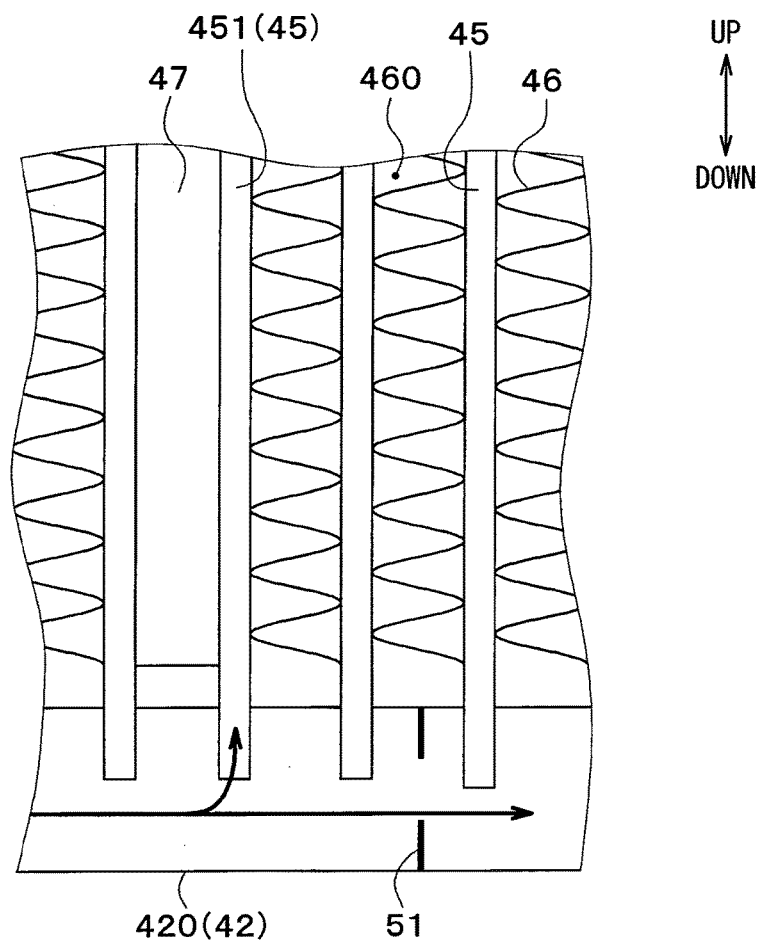
FIG. 12 is an explanatory view showing a portion of an evaporator according to a first modified example.

(1) According to the above described first embodiment, an explanation was given for an example where among the plurality of tubes 45, the cold storage material container 47 is joined to the tubes 45 which are positioned immediately upstream in the coolant flow direction from the aperture plate 51 in the coolant passage, but this is not limiting. In other words, as shown in a first modified example of FIG. 12, the cold storage material container 47 may be joined to any arbitrary tube 45 which is disposed upstream in the coolant flow direction from the aperture plate 51 in the coolant passage.

Figure 20:
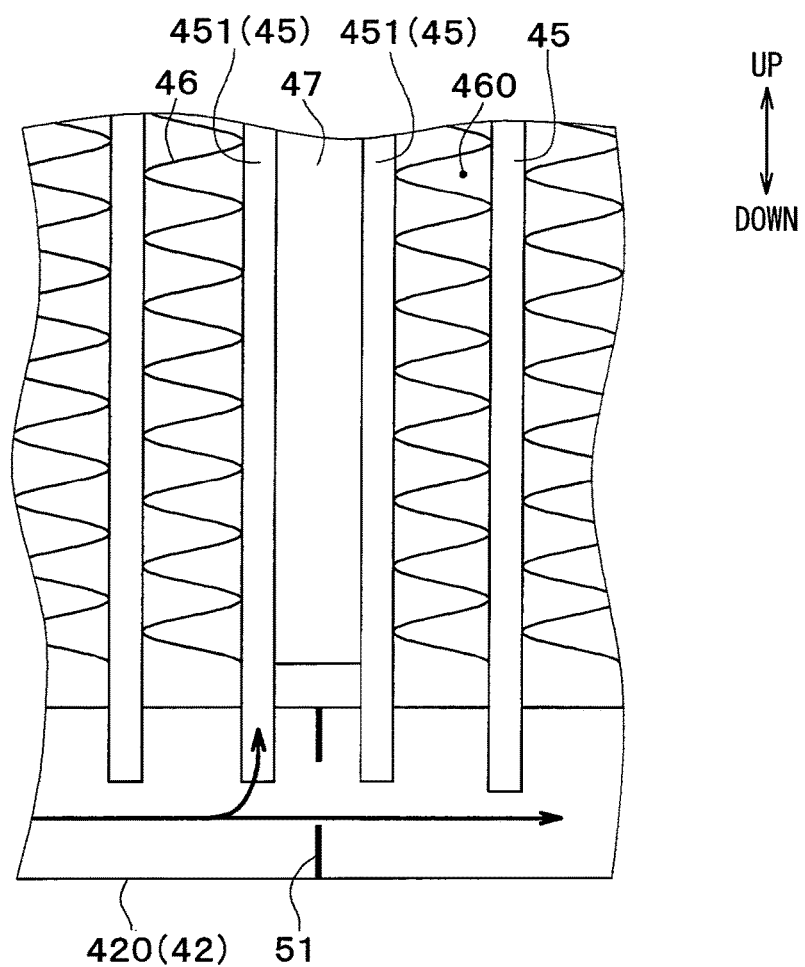
FIG. 20 is an explanatory view showing a portion of an evaporator according to a modification of a first modified example.

Further, as shown by a modification of the first modified example in FIG. 20, the cold storage material container 47 may be connected to a tube 45 disposed immediately upstream in the coolant flow direction from the aperture plate 51 in the coolant passage and a tube 45 positioned immediately downstream in the coolant flow direction from the aperture plate 51 in the coolant passage.

Similarly, in the above described second embodiment as well, the cold storage material container 47 may be connected to any arbitrary tube which is disposed upstream in the coolant flow direction from the protruding portion 52 in the coolant passage. Similarly, in the above described third and fourth embodiments as well, the cold storage material container 47 may be joined to any arbitrary tube which is disposed upstream in the coolant flow direction from the protruding tube 452 in the coolant passage.

Figure 13:
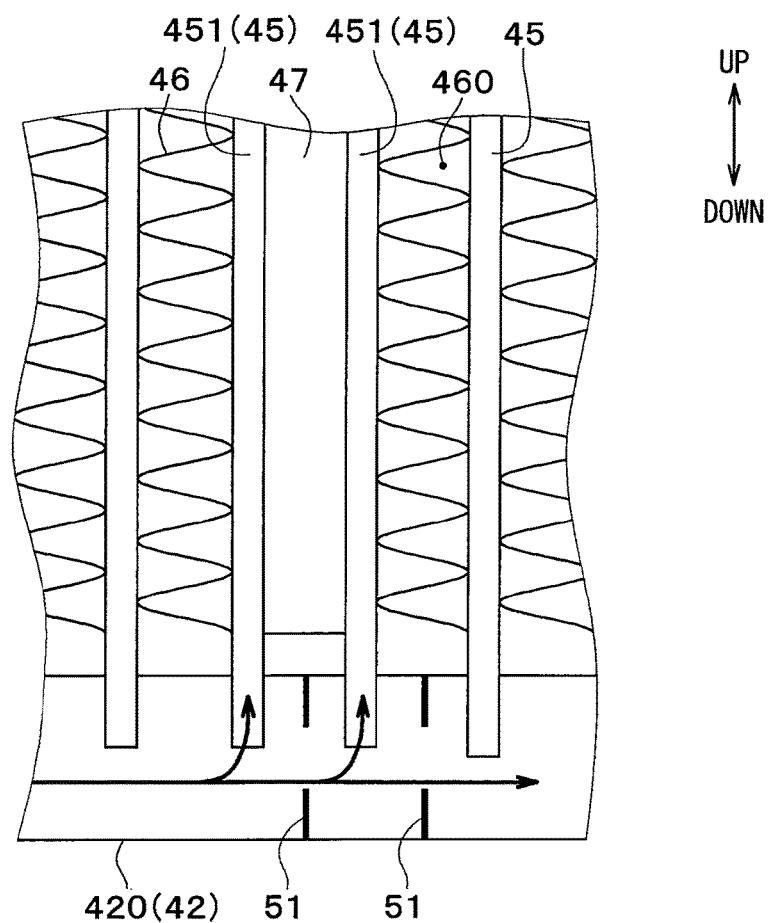
FIG. 13 is an explanatory view showing a portion of an evaporator according to a second modified example.

(2) According to the above described first embodiment, an example is explained where among the two tubes 45 joined to the cold storage material container 47, the aperture plate 51 is disposed immediately downstream in the coolant flow direction from the tube 45 positioned downstream in the coolant flow direction in the coolant passages of the distribution tank units 410, 420, 431, 440. However, this is not limiting. For example, as shown in a second modified example of FIG. 13, an aperture plate 51 may be disposed immediately downstream in the coolant flow direction from each of the two tubes 45 joined to the cold storage material container 47.

Similar, in the above described second embodiment, a protruding portion 52 may be disposed immediately downstream in the coolant flow direction from each of the two tubes 45 joined to the cold storage material container 47.

(3) In the above described third and fourth embodiments, an explanation is provided for examples where among two tubes 45 joined to the cold storage material container 47, only the tube 45 disposed downstream in the coolant flow direction is the protruding tube 452. However, this is not limiting. For example, both of the tubes 45 joined to the cold storage material container 47 may be protruding tubes 452 (third modified example).

(4) In the above described fifth and sixth embodiments, an explanation is provided for examples where among two tubes 45 joined to the cold storage material container 47, only the tube 45 disposed downstream in the coolant flow direction is the large channel tube 453. However, this is not limiting. For example, both of the tubes 45 joined to the cold storage material container 47 may be large channel tubes 453 (fourth modified example).

Figure 14:
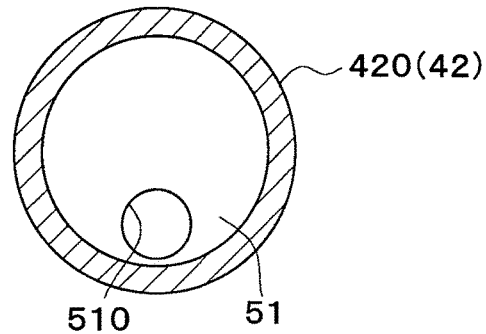
FIG. 14 is an cross-sectional view showing a the vicinity of an aperture plate of an evaporator according to a fifth modified example.
Figure 15:
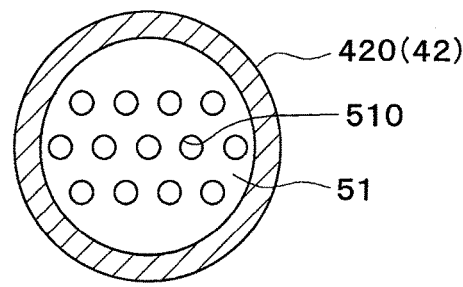
FIG. 15 is an cross-sectional view showing a the vicinity of an aperture plate of an evaporator according to a fifth modified example.

(5) In the above described first embodiment, and explanation is given for an example where one coolant flow hole 510 is formed at substantially the center of the aperture plate 51. However, this is not limiting. In other words, a plurality of coolant flow holes 510 may be disposed, and the coolant flow hole 510 may be disposed at any arbitrary location on the aperture plate 51. For example, as shown by a fifth modified example in FIG. 14, one coolant flow hole 510 may be formed on the lower side of the aperture plate 51 in the vertical direction. Further, as shown in FIG. 15, a plurality of small coolant flow holes 510 may be disposed over the whole surface of the aperture plate 51.

Figure 16:
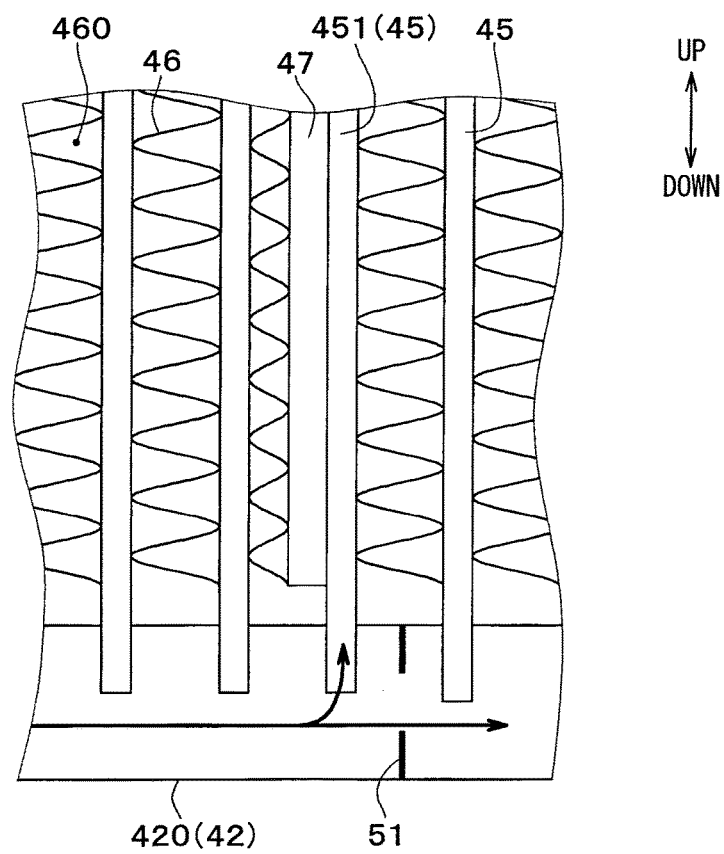
FIG. 16 is an explanatory view showing a portion of an evaporator according to a sixth modified example.

(6) In each of the above described embodiments, an explanation is given for an example where one cold storage material container 47 is joined to two tubes 45, but this is not limiting. As shown by a sixth modified example in FIG. 16, the cold storage material container 47 may be joined to both a tube 45 and air-side fins 46.

Figure 17:
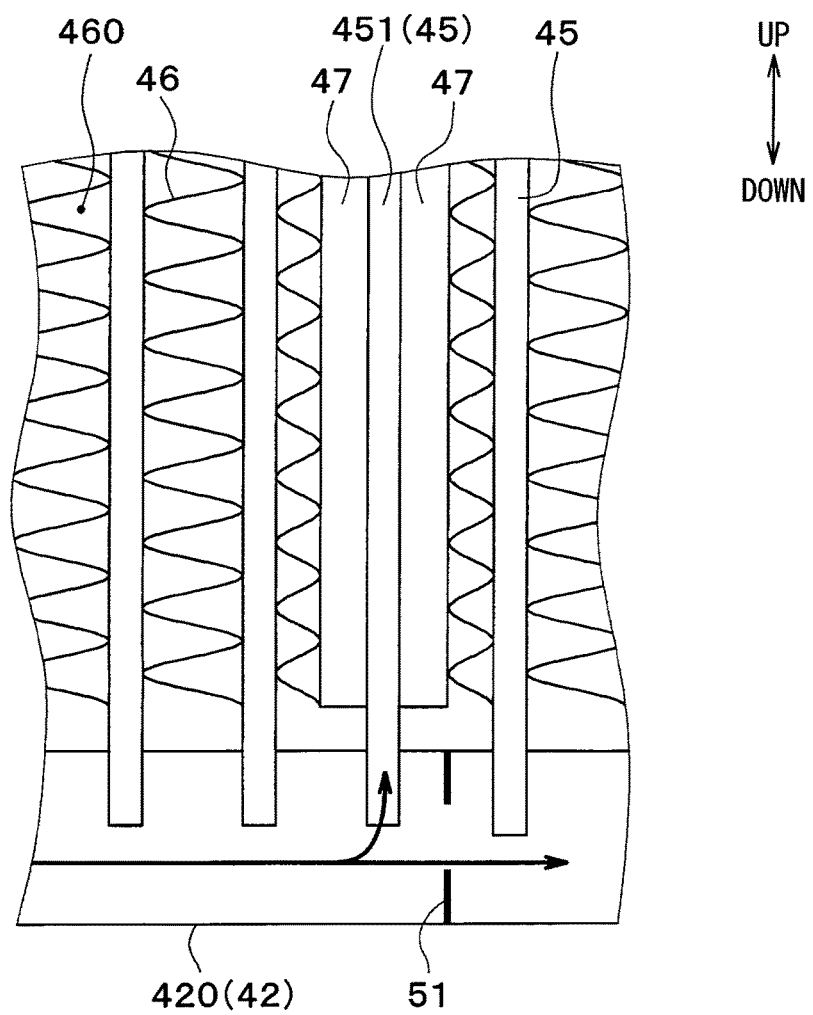
FIG. 17 is an explanatory view showing a portion of an evaporator according to a sixth modified example.

Further, as shown in FIG. 17, the two main surfaces of a tube 45 may each be joined to the cold storage material container 47. In this case, the main surface of the cold storage material container 47 opposite from the main surface joined to the tube 45 may be joined to air-side fins 46.

Figure 18:
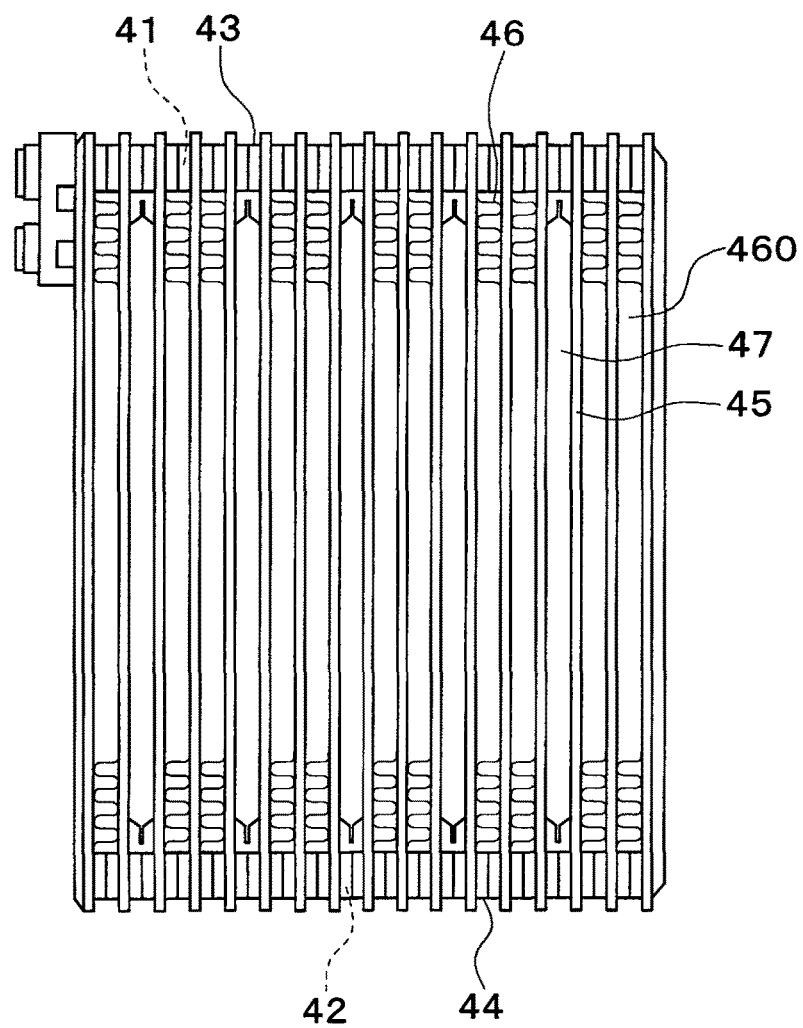
FIG. 18 is an explanatory view showing a portion of an evaporator according to a seventh modified example.

(7) In each of the above described embodiments, an explanation is given for an example where the evaporator 40 includes the plurality of tubes 45 and the first to fourth headers 41-44 and the like which collect and distribute coolant flowing in the plurality of tubes 45. In other words, the evaporator 40 is configured as a so-called tank and tube type heat exchanger. However, this example is not limiting. In other words, as shown by a seventh modified example of FIG. 18, the evaporator 40 includes a plurality of channel plates, which form a coolant passage, where pairs of plate shaped members are joined. Then, the channel plates may be multiply disposed in a laminated layer and interposed between air-side fins 46 or cold storage material containers 47, i.e., a so-called drawn cup type heat exchanger. Further, in each of the above described embodiments, an explanation is given for an example where the tubes 45 are perforated pipes, but this is not limiting. In other words, the tubes 45 may be tubes with inner fins disposed therein, the inner fins compartmentalizing the inside into a plurality of coolant passages.

The invention claimed is:

1. A cold storage heat exchanger, comprising:
a plurality of tubes disposed with a spacing between each other, a coolant flowing in the plurality of tubes;
a cold storage material container joined to the plurality of tubes, the cold storage material container defining a room that houses a cold storage material; and
a distribution tank unit that distributes the coolant to the plurality of tubes, wherein
a coolant passage is formed in the plurality of tubes and the distribution tank unit,
the distribution tank unit includes an aperture plate that reduces a passage cross-sectional area of the coolant passage in the distribution tank unit,
among the plurality of tubes, the cold storage material container is interposed between two adjacent tubes among the plurality of tubes, the two adjacent tubes being disposed upstream in a coolant flow direction from the aperture plate in the coolant passage,
the aperture plate is disposed in the distribution tank unit, the aperture plate being formed separately from the distribution tank unit and including a coolant flow hole through which the coolant flows,
the diameter of the coolant flow hole is smaller than the diameter of the coolant passage in the distribution tank unit,
the plurality of tubes include
the two adjacent tubes each of which includes one surface joined to the cold storage material container, and
another tube different from the two adjacent tubes having both surfaces joined to an air-side fin, and
within the coolant passage, no aperture plate is disposed within a region that ranges from the two adjacent tubes to the first tube among the plurality of tubes upstream of the two adjacent tubes.

2. The cold storage heat exchanger of claim 1, wherein among the plurality of tubes, the cold storage material container is joined to a tube disposed immediately upstream in a coolant flow direction from the aperture plate in the coolant passage.

3. The cold storage heat exchanger of claim 1, wherein the cold storage heat exchanger forms an evaporator that exchanges heat between the coolant flowing in the tubes and air to evaporate the coolant.

4. The cold storage heat exchanger of claim 1, wherein the two adjacent tubes are directly fixed to the cold storage material container.

5. The cold storage heat exchanger of claim 1, wherein the aperture plate is disposed within a region that ranges from the two adjacent tubes to the first tube among the plurality of tubes downstream of the two adjacent tubes.

6. The cold storage heat exchange of claim 5, wherein the two adjacent tubes are directly fixed to the cold storage material container.

\* \* \* \* \*